(12) United States Patent
Flory et al.

(10) Patent No.: US 9,928,944 B2
(45) Date of Patent: Mar. 27, 2018

(54) CABLE WITH POLYMER COMPOSITE CORE

(71) Applicant: Dow Global Technologies LLC, Midland, MI (US)

(72) Inventors: Anny L. Flory, Philadelphia, PA (US); Lin Fu, Naperville, IL (US); Damien Polanksy, Katy, TX (US); Chester J. Kmiec, Phillipsburg, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/899,798

(22) PCT Filed: Jul. 7, 2014

(86) PCT No.: PCT/US2014/045520
§ 371 (c)(1),
(2) Date: Dec. 18, 2015

(87) PCT Pub. No.: WO2015/009468
PCT Pub. Date: Jan. 22, 2015

(65) Prior Publication Data
US 2016/0148725 A1 May 26, 2016

Related U.S. Application Data

(60) Provisional application No. 61/856,204, filed on Jul. 19, 2013.

(51) Int. Cl.
*H01B 11/18* (2006.01)
*G02B 6/44* (2006.01)
(Continued)

(52) U.S. Cl.
CPC ........... *H01B 11/18* (2013.01); *G02B 6/4434* (2013.01); *H01B 1/02* (2013.01); *H01B 3/002* (2013.01); *H01B 3/47* (2013.01)

(58) Field of Classification Search
CPC .................................................... H01R 13/035
(Continued)

(56) References Cited

U.S. PATENT DOCUMENTS 3,193,712 A * 7/1965 Harris ...................... H01B 9/04
174/105 R
3,309,455 A * 3/1967 Mildner ............. H01B 11/1826
156/54
(Continued)

OTHER PUBLICATIONS

PCT/US2014/045520, International Search Report and Written Opinion of the International Searching Authority dated Sep. 18, 2014.
(Continued)

*Primary Examiner* — Chau N Nguyen
(74) *Attorney, Agent, or Firm* — Husch Blackwell LLP

(57) ABSTRACT

Conductive cores for use in cables, where the conductive core comprises a filled-polymeric-composite material concentrically surrounded by a conductive layer. The filled-polymeric-composite material comprises a polymeric continuous phase having dispersed therein a filler material. Such conductive cores can be employed in various cable designs and further include one or more outer layers, such as dielectric insulation layers, conductive shield layers, and jackets.

7 Claims, 2 Drawing Sheets

(51) Int. Cl.
*H01B 3/00* (2006.01)
*H01B 3/47* (2006.01)
*H01B 1/02* (2006.01)

(58) Field of Classification Search
USPC .................................... 174/113 C, 126.4, 28
See application file for complete search history.

(56) References Cited

U.S. PATENT DOCUMENTS

| | | | |
|---|---|---|---|
| 4,857,600 A | 8/1989 | Gross et al. | |
| 5,246,783 A | 9/1993 | Spenadel et al. | |
| 5,355,427 A | 10/1994 | Gareis et al. | |
| 5,575,965 A | 11/1996 | Caronia et al. | |
| 6,326,551 B1 * | 12/2001 | Adams | H01B 11/1804 174/113 C |
| 6,496,629 B2 | 12/2002 | Ma et al. | |
| 6,714,707 B2 | 3/2004 | Rossi et al. | |
| 7,026,377 B1 * | 4/2006 | Grant | B29B 7/14 264/239 |
| 8,906,515 B2 | 12/2014 | Tomantschger et al. | |
| 2002/0044750 A1 | 4/2002 | Ma et al. | |
| 2005/0279527 A1 * | 12/2005 | Johnson | H01B 13/0235 174/106 R |
| 2006/0263017 A1 | 11/2006 | Martin | |
| 2008/0221254 A1 * | 9/2008 | El-Zayatie | C08J 5/043 524/494 |
| 2010/0044075 A1 * | 2/2010 | Weiss | H01B 1/22 174/126.2 |
| 2010/0304065 A1 | 12/2010 | Tomantschger et al. | |
| 2012/0073859 A1 * | 3/2012 | Lo | H01L 24/43 174/126.4 |
| 2012/0090892 A1 | 4/2012 | Meyer et al. | |
| 2012/0090998 A1 * | 4/2012 | Rylatt | B01D 57/02 204/456 |
| 2015/0111673 A1 | 4/2015 | Tomantschger et al. | |

OTHER PUBLICATIONS

PCT/US2014/045520, International Preliminary Report on Patentability dated Jan. 19, 2016.

* cited by examiner

US 9,928,944 B2

CABLE WITH POLYMER COMPOSITE CORE

REFERENCE TO RELATED APPLICATIONS

The present application claims the benefit of U.S. Provisional Application No. 61/856,204, filed on Jul. 19, 2013.

FIELD

Various embodiments of the present invention relate to conductive cores for use in cables, where the conductive core comprises a filled-polymeric-composite material concentrically surrounded by a conductive layer.

INTRODUCTION

Tower-based radio ("TBR") base stations, the typical architecture of current cellular base stations, co-locate a radio subsystem and common equipment in the same housing at or near the base of a cellular tower. The housing is often either an on-site but or a base-station-specific environmental enclosure. The radio subsystem is typically connected to tower-mounted antennas via coaxial cable, with one coaxial cable being used for each antenna. The average occupant per cellular tower is 2.3 globally, and each occupant typically employs 5 to 9 antennas. Thus, the number of coaxial cables on any given cellular tower may range from 12 to 20, on average. Additionally, typical coaxial cable diameters range from ¼" to 2¼". The weight of a typical ⅞" coaxial cable is about 0.5 kg/m. Thus, a 40-meter, ⅞" coaxial cable can weigh 20 Kg. In view of the typical number of cables employed and the typical weight of such cables, the load on a given cell tower due to the weight of coaxial cables can be considerable.

One of the objectives of base-station design is to minimize the amount of load on the cellular tower. Accordingly, a desire exists for improvements in cable design.

SUMMARY

One embodiment is a cable, comprising:
a conductive core; and
one or more layers surrounding said conductive core,
wherein said conductive core comprises an elongated polymeric inner member concentrically surrounded by a conductive layer,
wherein said polymeric inner member is formed from a filled-polymeric-composite material that comprises a polymeric continuous phase having dispersed therein a filler material.

BRIEF DESCRIPTION OF THE DRAWINGS

Reference is made to the accompanying drawings in which.

DETAILED DESCRIPTION

Various embodiments of the present invention concern conductive cores for use in cables, where the conductive core comprises an elongated polymeric inner member concentrically surrounded by a conductive layer. The polymeric inner member comprises a filled-polymeric-composite material that comprises a polymeric continuous phase having dispersed therein a filler material. Such conductive cores can be surrounded by one or more additional layers, such as dielectric insulating layers, conductive shields, and/or cable jackets, so as to form a cable.

Conductive Core

Figure 1:
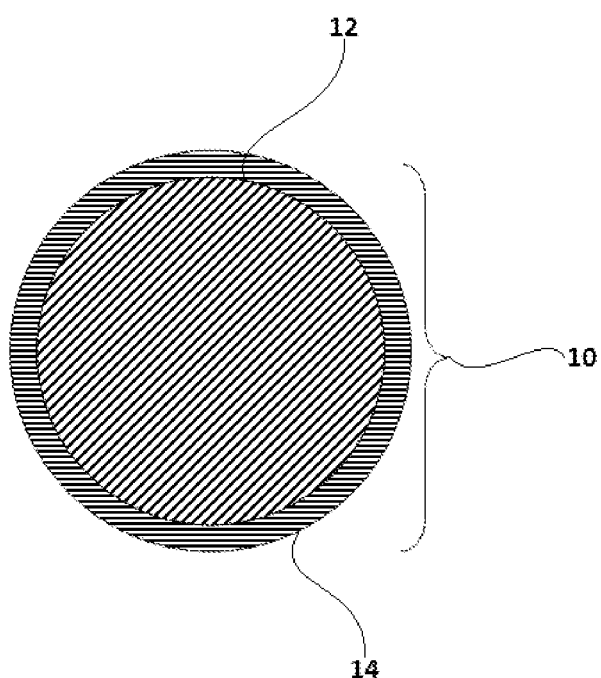
FIG. 1 is a cross-sectional view of a conductive core constructed in accordance with one or more embodiments of the present invention.

Referring initially to FIG. 1, a conductive core 10 is depicted comprising an elongated polymeric inner member 12 concentrically surrounded by a conductive layer 14. The elongated polymeric inner member 12 is formed from a filled-polymeric-composite material that comprises a polymeric continuous phase having a filler material dispersed therein.

In various embodiments, the polymer employed as the polymeric continuous phase can be a thermoset or thermoplastic polymer. As used herein, "polymer" means a macromolecular compound prepared by reacting (i.e., polymerizing) monomers of the same or different type. The term "polymer" includes both homopolymers and interpolymers. The term "interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), tetrapolymers (four different monomers), etc. As known in the art, a "thermoset" polymer is a polymer that irreversibly cures (or crosslinks). Thermoset polymers are generally prepared from an initially un-crosslinked polymer or pre-polymer resin, which is then subjected to a curing process (e.g., heating, irradiation, or chemical reaction). "Thermoplastic" polymers are polymers that become pliable or moldable above a specific temperature, and return to a solid state upon cooling.

Polymers suitable for use as the polymeric continuous phase include, but are not limited to, thermoset polymers such as epoxy polymers (a.k.a., polyepoxides), and thermoplastic polymers such as polycarbonates, polysulfones, polyamideimides, polyarylates, polyesters, polyphenylenes, polyphenylene oxides, polyphenylene sulfides, polyether ketones, polyetherether ketones, polyarylether ketones, polyamides (e.g., nylons), polyarylamides, polyphthalamides, and polyetherimides. Furthermore, the polymer suitable for use herein can be a mixture of any two or more of the above-described polymers. In various embodiments, the polymeric continuous phase is an epoxy polymer. Examples of suitable commercially available epoxy polymers for use as the polymeric continuous phase include, but are not limited to, D.E.R.® 330, D.E.R.® 331, D.E.R.® 332, D.E.R.® 324, D.E.R.® 352, D.E.R.® 354, D.E.R.® 383, D.E.R.® 542, D.E.R.® 560, D.E.N.® 425, D.E.N.® 431, D.E.N.® 438, D.E.R.® 542, D.E.R.® 560, D.E.R.® 736, D.E.R.® 732 or mixtures thereof. D.E.R.® and D.E.N.® resins are commercially available from The Dow Chemical Company, Midland, Mich., USA. Examples of commercially available thermoplastic polymers suitable for use herein include LEXAN™ 221, a polycarbonate available from Sabic Innovative Plastics, Pittsfield, Mass., USA; MAKROLON™ 2207, or APEC™ 1697, both polycarbonates available from Bayer MaterialScience AG, Leverkusen, Germany; ULTRASON™ S2010, a polysulfone available from BASF Corporation, Wyandotte, Mich., USA; and UDEL™ 10 P1700, a polysulfone available from Solvay Specialty Polymers USA, LLC, Augusta, Ga., USA.

Fillers suitable for use in the filled-polymeric-composite material can have any conventional or hereafter discovered shape, particle size, and density. In various embodiments, the filler can have a shape selected from particulates (such as granules or powder), fibers, platelets, spheres, needles, or any combination thereof. Furthermore, the filler can be crystalline, semi-crystalline or amorphous. Additionally, when a particulate filler is employed, the filler can have an average particle size ($d_{50\%}$) in the range of from 0.0005 to 500 μm, from 1 to 300 μm, or from 5 to 100 μm. When fibrous fillers are employed, the filler can have an aspect ratio of less than 4:1, less than 3:1, less than 2:1, or about 1:1.

Specific examples of fillers suitable for use as the filler material in the filled-polymeric-composite material include, but are not limited to, glass fibers, quartz, silica, silicon oxide, fused silica, fused quartz, natural silica, synthetic silica, natural aluminum oxide, synthetic aluminum oxide, aluminum trihydroxide, aluminum-oxide-hydroxide, magnesium hydroxide, aluminum hydroxide oxide, boron nitride, aluminum nitride, silicon nitride, silicon carbide, mica, calcium carbonate, lithium aluminum silicate, zinc oxide, mullite, wollastonite, talcum, glimmer, kaolin, bentonite, boehmite, xonolit, andalusite, zeolite, dolomite, vermiculite, muscovite, nepheline, albite, microline, slate, aluminum powder, silver, graphite, synthetic graphite, natural graphite, amorphous graphite, flake graphite, vein graphite, expandable/intumescent graphite, antimony oxides, borates (including zinc borates and sodium borates), molybdates (including calcium molybdate and zinc molybdate), stannates (including zinc stannate), phosphinates (including aluminum phosphinates, aluminum phosphinite), ammonium polyphosphate, melamine polyphosphate, melamine salts, zinc sulfide, red phosphorous, layered clays (including montmorillonite and hectorite), gold, carbon, single or multi-wall carbon nanotubes, graphene, glass powder, glass fabric, glass sheets, carbon fibers, other organic or inorganic particulate fillers or mixtures thereof. In an embodiment, the filler material is glass fibers.

The filled-polymeric-composite material can be prepared according to any known or hereafter discovered methods for preparing a polymer composite. In various embodiments, the filled-polymeric-composite material can be prepared by a pultrusion process. In typical pultrusion processes, the filler material is first passed through an un-crosslinked polymeric resin to coat the filler material with the resin. Thereafter, the coated filler can be passed through preform plates to begin shaping the filler/resin bundle. Finally, the preformed filler/resin bundle can be passed through a heated die to cure (i.e., crosslink) the resin, thereby forming the filled-polymeric-composite material.

In various embodiments, the filler can be present in the filled-polymeric-composite material in an amount of at least 30 weight percent, at least 40 weight percent, at least 50 weight percent, at least 60 weight percent, or at least 70 weight percent, based on the combined weight of the filler and the polymeric continuous phase in the filled-polymeric-composite material. In such embodiments, the filler can be present in the filled-polymeric-composite material in an amount of up to 90, up to 85, or up to 80 weight percent, based on the combined weight of the filler and the polymeric continuous phase in the filled-polymeric-composite material. In such embodiments, the above-described polymeric continuous phase can constitute the balance of the entire filled-polymeric-composite material.

In various embodiments, the filled-polymeric-composite material can have a density of less than 4 g/cm$^3$, less than 3.5 g/cm$^3$, less than 3 g/cm$^3$, less than 2.5 g/cm$^3$, or less than 2.3 g/cm$^3$. Additionally, the filled-polymeric-composite material can have a density ranging from 1 to 4 g/cm$^3$, from 1.2 to 3 g/cm$^3$, from 1.4 to 2.8 g/cm$^3$, or from 1.6 to 2.3 g/cm$^3$. Density and specific gravity values for polymers and polymer composites provided herein are measured at 25° C. in accordance with ASTM D792.

In various embodiments, the filled-polymeric-composite material can have a tensile strength of at least 0.8 gigapascals ("gPa"), at least 0.9 gPa, at least 1 gPa, at least 1.1 gPa, or at least 1.2 gPa. Additionally, the filled-polymeric-composite material can have a tensile strength in the range of from 0.8 to 1.6 gPa, from 0.9 to 1.4 gPa, or from 1 to 1.3 gPa. Tensile strength is determined according to ASTM D638.

In various embodiments, a commercial filled-polymeric-composite material may be employed. An example of a commercially available filled-polymeric-composite material suitable for use herein includes, but is not limited to, LFH LIGHTLINE™, a composite of fiberglass and epoxy containing approximately 80 weight percent fiberglass, available from Neptco, Inc., Pawtucket, R.I., USA. Other exemplary commercially available filled-polymeric-composite materials include, but are not limited to, NYCAST™ GF from Cope Plastics Inc.; KETRON™ CA30 from Quadrant Engineering Plastic Products; and ZELUX™ by Westlake Plastics.

Referring still to FIG. 1, to be "conductive," the conductive layer 14 has a minimum electrical conductivity of $3 \times 10^7$ Siemens per meter when measured at 20° C. Thus, in various embodiments, the conductive layer 14 can be any conductive material having an electrical conductivity of at least $3 \times 10^7$ Siemens per meter when measured at 20° C. Additionally, the conductive layer 14 can have an electrical conductivity in the range of from $3 \times 10^7$ to $7 \times 10^7$ Siemens per meter when measured at 20° C. In various embodiments, the conductive layer 14 comprises a metal. Metals suitable for use as the conductive layer 14 include, but are not limited to, copper, silver, gold, aluminum, and combinations thereof. In an embodiment, the metal employed as the conductive layer 14 comprises copper.

The thickness of the conductive layer 14 can vary depending on the intended us of the conductive core 10. For example, when the conductive core 10 is employed in a coaxial cable designed for use in cellular towers, the lowest frequency expected to be transmitted by the conductive core 10 is about 700 MHz. At this lowest frequency, a thickness of 0.0026 mm (or 2.6 μm) is all that is needed to transmit the signal, since the signal travels near the surface of the conductor or on the skin of the conductor. Higher frequency signals require even less thickness to be transmitted. Thus, in various embodiments, the conductive layer 14 can have a thickness of at least 2.6 μm, or a thickness ranging from 2.6 to 30 μm, from 2.6 to 25 μm, or from 2.6 to 21 μm.

The conductive layer 14 can be applied to the elongated polymeric inner member 12 by any conventional or hereafter discovered means in the art. In an embodiment, the conductive layer 14 can be applied to the elongated polymeric inner member 12 by a metallization process. For example, an electroless copper plating process per AMS 2404D can be applied. In an embodiment, the metallization process can comprise the steps of (a) pre-treating the elongated polymeric inner member 12, (b) electroless plating a thin layer of metal (e.g., copper at a thickness of about 1 μm), (c) electroplating a second metal layer (e.g., copper) at a thickness of up to 20 μm, and (d) optionally electroplating a third metal layer (e.g., aluminum) at a desired thickness (e.g., 1

μm). Pretreatment of step (a) includes such processes as chemical acid/base etching and/or physical roughening (e.g., sandblasting).

In various embodiments, the following method can be employed:

| Step | Product | Chemicals (vol %) | Temp. | Time | Post Rinse |
|---|---|---|---|---|---|
| 1 | Sweller | 11.5% CUPOSIT ™ Z Solution + 12.5% CIRCUPOSIT ™ MLB Conditioner 211 | 80° C. | 10 min | 3 min |
| 2 | Oxidizer | 15% CUPOSIT Z Solution + 10% CIRCUPOSIT MLB Promoter 213A-1 | 80° C. | 20 min | 3 min |
| 3 | Neutralizer | 5% CIRCUPOSIT MLB Neutralizer 216-5 | 40° C. | 5 min | 3 min |
| 4 | Sweller | 11.5% CUPOSIT Z Solution + 12.5% CIRCUPOSIT MLB Conditioner 211 | 80° C. | 10 min | 3 min |
| 5 | Oxidizer | 15% CUPOSIT Z Solution + 10% CIRCUPOSIT MLB Promoter 213A-1 | 80° C. | 20 min | 3 min |
| 6 | Neutralizer | 5% CIRCUPOSIT MLB Neutralizer 216-5 | 40° C. | 5 min | 3 min |
| 7 | Conditioner | 3% CIRCUPOSIT Conditioner 3323A | 40° C. | 5 min | 4 min |
| 8 | Microetch | 2% $H_2SO_4$ + 100 g/l Sodium persulfate | 22° C. | 1 min | 3 min |
| 9 | Predip | 250 g/l CATAPREP ™ 404 Pre-Dip | 22° C. | 1 min | None |
| 10 | Catalyst | 250 g/l CATAPREP ™ 404 Pre-Dip + 2% CATAPOSIT ™ 44 Catalyst Concentrate | 40° C. | 5 min | 2 min |
| 11 | Electroless Copper | CIRCUPOSIT 3350-1 Electroless Copper 15% 3350 M-1 + 1% 3350 A-1 with 8 g/l NaOH, 3 g/l formaldehyde | 46° C. | 20 min | 2 min |
| 12 | Electrolytic Copper | To 25 micron deposit thickness | | | 2 min |

The conductive layer can be applied using typical plating techniques. An example of a specific plating technique is described in detail in the following Examples.

The coefficient of linear thermal expansion of the resulting conductive core can be less than 50 micrometers per meter Kelvin ("μm/m·K"), less than 40 μm/m·K, less than 30 μm/m·K, or less than 20 μm/m·K. In various embodiments, the coefficient of linear thermal expansion of the conductive core can be in the range of from 1 to 50 μm/m·K, from 3 to 40 μm/m·K, from 5 to 30 μm/m·K, or from 6 to 20 μm/m·K. Coefficient of linear thermal expansion is determined according to ASTM E831

In various embodiments, the resulting conductive core can have a flexural modulus of at least 1,000,000 psi, at least 1,200,000 psi, or 1,400,000 psi. Additionally, the conductive core can have a tensile modulus in the range of from 1,000,000 psi to 10,000,000 psi, from 1,200,000 psi to 8,000,000 psi, or from 1,400,000 psi to 7,000,000 psi. Flexural modulus is determined according to ASTM D790.

In one or more embodiments, the conductive core can have a surface resistance ranging from 0.030 to 0.080 ohms, from 0.040 to 0.070 ohms, from 0.045 to 0.065 ohms, or from 0.050 to 0.058 ohms. Surface resistance is measured using a Fluke 8840A multimeter between two electrodes spaced 6 inches apart. A direct voltage of 200 V is applied between the two electrodes with an electrification time of 60 seconds. The resistance is measured in ohm.

Coated Conductor

As noted above, a cable comprising a core and at least one layer surrounding the core can be prepared employing the above-described conductive core 10. As used herein, the term "cable" means at least conductor within a sheath, e.g., an insulation covering or a protective outer jacket. Often, a cable is two or more conductors (e.g., wires or optical fibers, in addition to the above-described conductive cores) bound together, typically in a common insulation covering and/or protective jacket. The individual conductors inside the sheath may be bare, covered or insulated. Typical cable designs are illustrated in U.S. Pat. Nos. 5,246,783, 6,496,629 and 6,714,707. "Conductor" denotes one or more wire(s) or fiber(s) for conducting heat, light, and/or electricity, and includes the conductive core 10 described above. When other conductor types are present, such as in a combination cable, the other conductor(s) may be a single-wire/fiber or a multi-wire/fiber and may be in strand form or in tubular form. Non-limiting examples of other suitable conductors include metals such as silver, gold, copper, carbon, and aluminum. The other conductors may also be optical fiber made from either glass or plastic.

Such a cable can be prepared with various types of extruders (e.g., single or twin screw types) by extruding a polymeric composition that forms one or more layers onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Optionally, following extrusion, the extruded cable can pass into a heated cure zone downstream of the extrusion die to aid in cross-linking polymeric layers. The heated cure zone can be maintained at a temperature in the range of 175 to 260° C. In an embodiment, the heated cure zone is a continuous vulcanization ("CV") tube. In various embodiments, the cable can then be cooled and degassed. Alternatively, if the polymeric layer(s) is to remain un-crosslinked, the extruded cable can pass into a cooling zone, such as a water trough, to be cooled.

Figure 2:
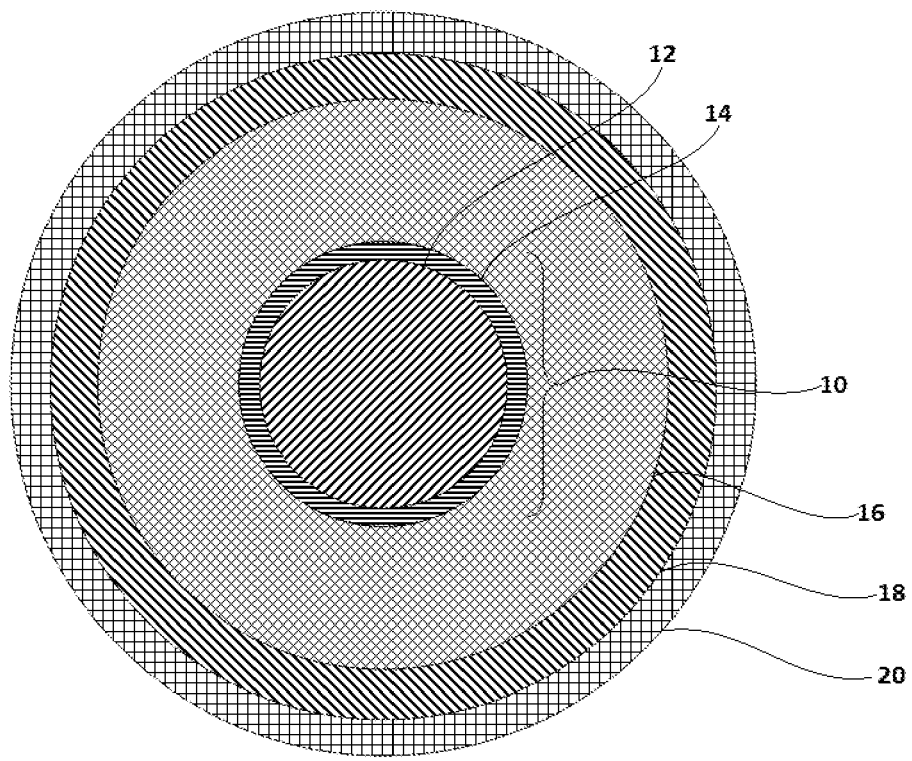
FIG. 2 is a cross-sectional view of a coaxial cable constructed in accordance with one or more embodiments of the present invention.

Referring now to FIG. 2, a coaxial cable can be constructed in accordance with various embodiments using the above-described conductive core 10, a dielectric insulation layer 16, a conductive shield 18, and optionally an outer jacket 20. Each of the dielectric insulation layer 16, the conductive shield 18, and the outer jacket 20 can be formed from any conventional or hereafter discovered materials employed in the art. For example, the dielectric insulation layer 16 can be formed from one or more types of polyethylene. Additionally, the conductive shield 18 can be a solid, stranded, or woven copper shield. Finally, the jacket 20 can be, for example, a polyvinyl chloride or polyethylene.

Test Methods

Density
Density is determined according to ASTM D792.
Tensile Strength
Tensile Strength is determined according to ASTM D638.
Flexural Modulus
Flexural modulus is determined according to ASTM D790.
Coefficient of Linear Thermal Expansion
Coefficient of linear thermal expansion is determined according to ASTM E831.
Coating Adhesion
Coating adhesion is determined according to ASTM B571, paragraph 13 (scribe and grid test).
Resistivity
Surface resistance is measured using a Fluke 8840A multimeter between two electrodes spaced 6 inches apart. A direct voltage of 200 V was applied between the two electrodes with an electrification time of 60 seconds. The resistance is measured in ohm.

EXAMPLES

Example 1—Comparison of Filled-Polymeric-Composite Material to Copper

A non-metal-plated filled-polymer composite material (S1) is analyzed and compared to a copper wire (CS1). The filled-polymeric-composite material is LFH LIGHTLINE™, a composite of fiberglass and epoxy containing approximately 80 weight percent fiberglass, available from Neptco, Inc., Pawtucket, R.I., USA. The copper wire is obtained from HM Wire International, Inc., Canton, Ohio, USA. Results of the analyses are provided in Table 1, below.

TABLE 1

Properties of S1 and CS1

|  | S1 | CS1 |
|---|---|---|
| Density (g/cm$^3$) | 2.24 | 8.89 |
| Coefficient of linear thermal expansion (μm/m · K) | 5.9 | 16.8 |
| Tensile strength (GPa) | 1.2 | 0.27 |

As seen in Table 1, the polymer composite material of S1 offers a lower density, lower coefficient of linear thermal expansion, and greater tensile strength compared to conventional copper wire.

Example 2—Physical and Electrical Properties of Conductors

Prepare two Samples (S2 and S3) by metalizing two composite material rods having diameters of 0.091 inches (S2) and 0.5 inches (S3). Sample S2 is a glass-filled epoxy composite material having 80% glass filler and is the same as the filled-polymeric-composite material employed in Example 1. Sample S3 is a glass-filled nylon material having 30% glass filler. The glass-filled nylon material of Sample S3 is Nylon 6 with 30% glass-fiber available from Professional Plastics. Prepare a Comparative Sample (CS2) by metalizing an un-filled nylon rod having a diameter of 0.093 inches. The nylon rod of CS2 is Quadrant EPP Nylon 101 available from Professional Plastics.

Metalize S2, S3, and CS2 with copper at a thickness of 500 micro-inches (12.7 μm). Metallization of S2, S3, and CS2 is performed according to AMS 2404D by the following method:
  a) Clean the polymeric rods by immersing them in a mixture of 5% v/v Cleaner-Conditioner 1110A (The Dow Chemical Company) with 95% v/v deionized water for 2 to 5 minutes at 130 to 170° F.;
  b) Cascade rinse the polymeric rods in three tanks of tap water, 2 to 5 minutes in each tank, at 50 to 90° F.;
  c) Prepare the rods by immersing them in a catalyst pre-dip for 1 to 5 minutes at 60 to 90° F. The catalyst pre-dip contains 98.5% v/v ionized water and 1.5% w/v sodium chloride;
  d) Immerse the polymeric rods for 4 to 5 minutes at 100 to 110° F. in catalyst prepared by dissolving 1.2 pounds/gallon of sodium chloride in 75% v/v deionized water, then adding 10% v/v hydrochloric acid, filter to remove all particulates, then add 1.0% v/v CATAPOSIT™ PM-959 catalyst and 0.6% v/v CATAPOSIT™ 449, and finally adding deionized water to 100% volume;
  e) Cascade rinse the polymeric rods in two tanks of tap water, 2 to 3 minutes in each tank, at 50 to 90° F.;
  f) Immerse the polymeric rods in CUPOSIT™ Accelerator 19H (The Dow Chemical Company) for 2 to 3 minutes at 80-85° F. Accelerator 19H is prepared by combining and mixing 92.5% v/v of deionized water with 7.5% v/v CUPOSIT™ Accelerator 19H;
  g) Rinse the polymeric rods in a tank of tap water for 2 to 3 minutes at 50 to 90° F.;
  h) Copper plate the polymeric rods by immersing them into a tank containing CIRCUPOSIT™ 3350-1 Electroless Copper (The Dow Chemical Company). CIRCUPOSIT™ 3350-1 is prepared by combining 80% v/v deionized water with 15% v/v CIRCUPOSIT™ 3350 M-1, 1% v/v CIRCUPOSIT™ 3350 A-1, 1% v/v of 50% sodium hydroxide, and 1% v/v of 37% formaldehyde. Deionized water added to 100% volume. Filter for a minimum of one hour before use. Duration of rod immersion in this step depends on desired thickness of coating. Thickness is checked to determine when rods are ready to continue on in the process. Thickness is determined based on ASTM B 499-96 using the Beta backscatter;
  i) Rinse by immersing the polymeric rods in deionized water for 1 to 10 minutes at 60 to 90° F.;
  j) Rinse by immersing the polymeric rods in three consecutive tanks of reverse osmosis water for 1 to 3 minutes in each tank at 60 to 90° F.;
  k) Immerse parts in postdip passivation solution for 1 to 2 minutes at 60 to 90° F. Postdip passivation solution prepared by combining 90% v/v (360 gallons) with 18.75 pounds of chromic acid and stir until complete dissolution. Add deionized water to 400 gallons;
  l) Rinse by immersing the polymeric rods in deionized water for 1 to 5 minutes at 60 to 90° F.;
  m) Rinse by immersing the polymeric rods in hot deionized water for 1 to 5 minutes at 80 to 100° F.;
  n) Polymeric rods then allowed to dry.

Analyze S2, S3, CS2, and the copper wire described above in Example 1 (CS1) for density, tensile strength, flexural modulus, coefficient of linear thermal expansion, coating adhesion, and resistivity according to the Test Methods provided above. The results are provided in Table 2, below.

TABLE 2

Physical and Electrical Properties of CS1, CS2, S2, and S3

|  | CS1 | CS2 | S2 | S3 |
|---|---|---|---|---|
| Density (g/cm$^3$) | 8.89 | 1.15 | 2.24 | 1.62 |
| Tensile Strength (psi) | 40,000 | 11,500 | 203,052 | 28,300 |
| Flexural Modulus (psi) | NA | 425,000 | 6,961,811 | 1,410,000 |
| Coefficient of Linear Thermal Expansion (μm/m · K) | 16 | 99 | 6 | 19 |
| Coating Adhesion | — | Pass | Pass | Pass |
| Resistivity (ohm) | 0.050 | 0.057 | 0.058 | 0.058 |

As the results provided in Table 2 show, an un-filled polymer provides unacceptably low tensile strength and unacceptably high coefficient of linear thermal expansion to be suitable for use as a cable core. In contrast, both the metalized filled epoxy and filled nylon provide properties similar or even better than standard copper wire.

Example 3—Weight Saving Illustration

The following Table 3 illustrates the potential weight savings using a filled polymeric composite core versus a conventional cable. In Table 3, the Comparative Sample CS3 is a commercial one-quarter-inch LDF1-50 RF cable (Heliax from Commscope) often used in cellular-tower applications. The hypothetical cable of Sample 4 (S4) uses the same materials as CS3 except for the inner conductor which is constructed from the metalized glass-filled epoxy material as in Example 2 (S2). The hypothetical cable of Sample 5 (S5) is made with the same materials as CS3 except that both the inner and outer conductors are made with metalized glass-filled epoxy material (S2).

TABLE 3

Illustration of Weight Saving for RF Coaxial Cable made with Composite versus Copper

|  | CS3 |  | S4 |  | S5 |
| --- | --- | --- | --- | --- | --- |
| Cable Weight (Kg/m) | 0.09 |  | 0.06 |  | 0.03 |
| Inner Conductor OD (mm) | copper (Al clad) | 2.54 | S2 | 2.54 | S2 2.54 |
| Inner Conductor (Kg/m) | 0.045 |  | 0.011 |  | 0.011 |
| Outer Conductor OD (mm) | copper | 7.87 | copper | 7.87 | S2 7.87 |
| Outer Conductor weight | 0.032 |  | 0.032 |  | 0.008 |
| Total Diameter | 8.76 |  | 8.76 |  | 8.76 |
| Weight Saving (%) |  |  | 37.8 |  | 64.4 |

The invention claimed is:

1. A cable, comprising:
a conductive core; and
one or more layers surrounding said conductive core,
wherein said conductive core comprises an elongated polymeric inner member concentrically surrounded by a conductive layer, the conductive layer is in direct contact with the elongated polymeric inner member,
wherein said polymeric inner member is formed from a thermoset filled-polymeric-composite material that comprises a polymeric continuous phase having dispersed therein a filler material, wherein said filled-polymeric-composite material has a density of less than 4 g/cm$^3$; and
the conductive core has (i) a tensile strength of at least 20,000 psi, and (ii) a flexural modulus of at least 1,000,000 psi;
wherein said cable is a coaxial cable, wherein said layers surrounding said conductive core comprise a dielectric insulation layer surrounding said conductive core and a conductive shield surrounding said dielectric insulation layer.

2. The cable of claim 1, wherein said conductive layer has a thickness of at least 2.6 micrometers ("µm").

3. The cable of claim 1, wherein said filled-polymeric-composite material is non-conductive.

4. The cable of claim 1, wherein said filler material is selected from the group consisting of glass fibers, quartz, silica, silicon oxide, fused silica, fused quartz, natural silica, synthetic silica, natural aluminum oxide, synthetic aluminum oxide, aluminum trihydroxide, aluminum-oxide-hydroxide, magnesium hydroxide, aluminum hydroxide oxide, boron nitride, aluminum nitride, silicon nitride, silicon carbide, mica, calcium carbonate, lithium aluminum silicate, zinc oxide, mullite, wollastonite, talcum, glimmer, kaolin, bentonite, boehmite, xonolit, andalusite, zeolite, dolomite, vermiculite, muscovite, nepheline, albite, microline, slate, aluminum powder, silver, graphite, synthetic graphite, natural graphite, amorphous graphite, flake graphite, vein graphite, expandable/intumescent graphite, antimony oxides, borates, molybdates, stannates, phosphinates, ammonium polyphosphate, melamine polyphosphate, melamine salts, zinc sulfide, red phosphorous, layered clays, gold, carbon, single or multi-wall carbon nanotubes, graphene, glass powder, glass fabric, glass sheets, carbon fibers, and combinations of two or more thereof; wherein said polymeric continuous phase is selected from the group consisting of epoxy polymers, nylons, polycarbonates, polysulfones, polyamideimides, polyarylates, polyesters, polyphenylenes, polyphenylene oxides, polyphenylene sulfides, polyether ketones, polyetherether ketones, polyarylether ketones, polyarylamides, polyphthalamides, and polyetherimides, and combinations of two or more thereof.

5. The cable of claim 1, wherein said conductive layer comprises a metal selected from the group consisting of copper, silver, gold, aluminum, and combinations thereof.

6. The cable of claim 1, wherein said conductive core has a coefficient of linear thermal expansion of less than 50 µm/m·K.

7. The cable of claim 1, wherein said cable has a weight-per-length of less than 0.07 kg/m.

* * * * *